United States Patent
Ogawa et al.

(10) Patent No.: US 6,501,553 B1
(45) Date of Patent: Dec. 31, 2002

(54) SURFACE PROFILE MEASURING METHOD AND APPARATUS

(75) Inventors: Hidemitsu Ogawa, Yokohama (JP); Akira Hirabayashi, Yokohama (JP); Katsuichi Kitagawa, Moriyama (JP)

(73) Assignees: Toray Engineering Co., Ltd., Osaka (JP); The Circle for the Promotion of Science and Engineering, Tokyo (JP)

( * ) Notice: Subject to any disclaimer, the term of this patent is extended or adjusted under 35 U.S.C. 154(b) by 138 days.

(21) Appl. No.: 09/644,893

(22) Filed: Aug. 24, 2000

(30) Foreign Application Priority Data

Aug. 27, 1999 (JP) .......................................... 11-241640

(51) Int. Cl.[7] .............................................. G01B 11/02
(52) U.S. Cl. ........................................ 356/512; 356/497
(58) Field of Search ................................ 356/497, 511, 356/512, 516

(56) References Cited

U.S. PATENT DOCUMENTS

| | | | |
|---|---|---|---|
| 4,791,584 A | | 12/1988 | Greivenkamp, Jr. |
| 5,133,601 A | * | 7/1992 | Cohen et al. ................ 356/497 |
| 5,194,918 A | | 3/1993 | Kino et al. |

OTHER PUBLICATIONS

*Three-dimensional imaging by sub-Nyquist sampling of white-light interferograms*, Optics Letters, vol. 18 No. 17, Sep. 1, 1993, Peter de Groot et al., pp. 1462–1464.

* cited by examiner

Primary Examiner—Samuel A. Turner
Assistant Examiner—Patrick Connolly
(74) Attorney, Agent, or Firm—Rader, Fishman & Grauer PLLC

(57) ABSTRACT

A surface profile measuring apparatus for measuring rugged profiles of object surfaces includes a white light source, a varying device for varying a relative distance between an object surface and a reference surface, a frequency band limiting device for limiting the frequency band of white light to a particular frequency band, an image pickup device for picking up an image of the object surface, a sampling device for successively acquiring intensity values of interference light corresponding to varying interference fringes, from a particular location at sampling intervals corresponding to a bandwidth of the particular frequency band, a storage device for storing a group of interference light intensity values acquired, and a computing device for estimating characteristic functions from the group of interference light intensity values stored, and determining a height in the particular location based on a peak position of the characteristic functions.

20 Claims, 8 Drawing Sheets

Fig.11

|  | S.I (μm) | L.P (μm) | | H.P (μm) | | S.H (μm) | |
|---|---|---|---|---|---|---|---|
|  |  | M | S.D | M | S.D | M (R.E) | S.D |
| this invention | 1.98 | 5.71 | 0.08 | 15.68 | 0.13 | 9.__ (0.21) | 0.15 |
| conventional 1 | 0.24 | 5.55 | 0.10 | 14.69 | 0.04 | 9.13 (8.20) | 0.10 |
| conventional 2 | 0.08 | 5.58 | 0.03 | 14.98 | 0.08 | 9.40 (5.54) | 0.04 |

S.I : sampling interval   L.P : lower portions   H.P : higher portions

S.H : level difference     M : mean measurement

S.D : standard deviation   R.E : relative error

SURFACE PROFILE MEASURING METHOD AND APPARATUS

BACKGROUND OF THE INVENTION (1) Field of the Invention

This invention relates to a surface profile measuring method and apparatus for measuring rugged surface profiles. More particularly, the invention relates to a technique of measuring surfaces in a non-contact mode by using white light.

(2) Description of the Related Art

Conventional apparatus of this type include a well-known surface profile measuring apparatus which employs a method of measuring, by means of white light interference, rugged profiles of precision products such as semiconductor wafers and glass substrates for liquid crystal displays.

As shown in FIG. 1, a conventional surface profile measuring apparatus comprises an interferometer, in which white light from a white light source 90 is directed through a first lens 91 to a half mirror 92. The white light reflected by the half mirror 92 is condensed by a second lens 93, and passes through a beam splitter 95 and irradiates an object surface 96 to be measured.

The beam splitter 95 of the interferometer divides the white light into a part that irradiates the object surface 96, and a part that irradiates a reference surface 94. The white light irradiating the reference surface 94 is reflected by a reflector 94a on the reference surface 94, and reaches the beam splitter 95 again. The white light having passed through the beam splitter 95 is reflected by the object surface 96, and reaches the beam splitter 95 again. The beam splitter 95 brings together, to the same path again, the white light reflected by the reference surface 94 and the white light reflected by the object surface 96. At this time, an interference phenomenon occurs, which corresponds to a difference between a distance L1 from the reference surface 94 to the beam splitter 95 and a distance L2 from the beam splitter 95 to the object surface 96. The white light with which the interference has occurred travels through the half mirror 92 and into a CCD camera 98.

The CCD camera 98 picks up an image of the object surface 96 along with the white light with which the interference has occurred. This construction includes a varying device, not shown, for vertically shifting a unit having the beam splitter 95. Such shifting of the beam splitter 95 varies the difference between distance L1 and distance L2, thereby increasing or decreasing the intensity of the white light incident on the CCD camera 98. When, for example, attention is directed to a particular location on the surface 96 within a region covered by the CCD camera 98, the beam splitter 95 is moved to vary the difference from distance L2<distance L1 to distance L2>distance L1. By measuring the intensity of white light having interfered (hereinafter referred to simply as "interference light") in the particular location, a waveform as shown in FIG. 2A, in theory, is obtained. A height in the particular location on the object surface may be derived from a peak position in the waveform of intensity variations of the interference light. The rugged profile of the surface is measured by determining heights in a plurality of locations in a similar way.

It is to be noted that actual data obtained by measuring the intensity of interference light are discrete as shown in FIG. 2B. It is necessary to derive a peak position in the waveform of intensity variations of the interference light from such data.

A method and apparatus for determining a peak position in a waveform are disclosed in U.S. Pat. No. 5,133,601, for example. In the method and apparatus disclosed therein, each discrete data as shown in FIG. 2B is squared to obtain data as shown in FIG. 2C. Subsequently, these data are smoothed into a waveform as shown in FIG. 2D. A height in a particular location is determined from a peak position of the smoothed waveform.

However, such prior method and apparatus have the following drawbacks.

In U.S. Pat. No. 5,133,601 noted above, a theoretical waveform as shown in FIG. 2A must be reproduced since a waveform with a peak position occurring at the height in a particular location is based on data obtained through actual measurements. That is, in order to measure, with sufficient precision, a height in a particular location on an object surface being measured, intensity values of the interference light in the particular location must be sampled so finely as to enable reproduction of a theoretical waveform.

As a result, an extended sampling time is required to acquire numerous intensity values, and hence a disadvantage of consuming a long time in measuring a surface profile. Further, a huge amount of data is acquired by the sampling, which requires an increased storage capacity for storing such data. This results in an increased cost of manufacturing the apparatus, and an extended computation time for processing the large amount of data, thereby further extending the time consumed in measuring the surface profile.

SUMMARY OF THE INVENTION

This invention has been made having regard to the state of the art noted above, and its object is to provide a surface profile measuring method and apparatus for measuring rugged profiles of object surfaces at a relatively high speed and with high precision by determining heights in particular locations with increased precision from a relatively small amount of data.

The above object is fulfilled, according to this invention, by a surface profile measuring method for measuring rugged profiles of object surfaces, wherein interference fringes are produced by varying a relative distance between an object surface and a reference surface while irradiating the two surfaces with white light from a white light source, variations in intensity value of interference light occurring at this time are measured for a plurality of particular locations on the object surface, and heights in the particular locations are derived from a group of interference light intensity values acquired from each particular location, the method comprising:

a first step of limiting a frequency band of the white light from the white light source to a particular frequency band;

a second step of varying the relative distance between the object surface and the reference surface irradiated with the white light in the particular frequency band;

a third step of acquiring a group of interference light intensity values which are successively collected from each of the particular locations on the object surface at sampling intervals corresponding to a bandwidth of the particular frequency band, the intensity values corresponding to variations in the interference fringes occurring with variations in the relative distance between the object surface and the reference surface;

a fourth step of estimating characteristic functions based on amplitude components of a theoretical waveform of intensity value variations derived from the group of interference light intensity values; and a fifth step of determining a height in each of the particular locations based on a peak position of the characteristic functions estimated.

The frequency band of the white light from the white light source is limited to a particular frequency band, and the white light in the particular frequency band irradiates the object surface and the reference surface. Interference fringes are produced according to an optical path difference between the white light reflected by the object surface and the white light reflected by the reference surface.

At this time, the relative distance between the object surface and the reference surface is varied to vary the optical path difference, and hence the interference fringes. Interference light intensity values resulting from the variations in the interference fringes are successively collected from a particular location on the object surface at sampling intervals corresponding to a bandwidth of the particular frequency band. As a result, a minimum group of interference light intensity values based on the white light in the particular frequency band is acquired.

An ideal waveform of the intensity value variations of interference light in the particular location is derived from the group of interference light intensity values, and characteristic functions based on amplitude components of the waveform are estimated. In the ideal waveform of the intensity value variations of interference light, a high-frequency function appears to vibrate within a low-frequency function. The characteristic functions correspond only to the low-frequency functions extracted. The characteristic functions have a peak position substantially coinciding with a position where the ideal waveform of interference fringes is at a maximum amplitude. Thus, a height in the particular location is determined based on the peak position. The rugged profile of the object surface is measured by determining heights in a plurality of such particular locations.

As described above, the frequency band of white light is limited to a particular frequency band, and the intensity values of interference fringes are sampled from each particular location at intervals corresponding to the bandwidth of the particular frequency band. Consequently, the intensity values may be sampled at larger sampling intervals than in the prior art which employs sampling intervals by taking the entire frequency band into account.

The group of interference light intensity values acquired through the sampling is one resulting from the white light in the particular frequency band. Consequently, a theoretical waveform form of the intensity value variations of interference light may be derived from the group of interference light intensity values. The characteristic functions based on amplitude components of the theoretical waveform may also be determined with ease.

Further, since a height in a particular location is determined based on the peak position of the characteristic functions, the height in the particular location may be determined faster than and with no less precision than in the prior art where a peak position is derived from a waveform based on actual measurement data.

That is, height information may be obtained from a smaller amount of data and with higher precision than in the prior art. This feature allows a surface profile to be measured in a reduced time, and requires only a reduced storage capacity for storing data, whereby an apparatus may be manufactured at reduced cost.

In this invention, preferably, the third step is executed with the sampling intervals determined by dividing $\pi$ by the bandwidth of the particular frequency band.

The sampling intervals are determined based on a value obtained by dividing $\pi$ by the bandwidth of the particular frequency band. As a result, the group of interference light intensity values may be acquired, which is a minimum group of sampled values needed to reproduce the theoretical waveform of the intensity value variations of interference light based on the white light in the particular frequency.

Since the sampling intervals are determined based on a value obtained by dividing $\pi$ by the particular frequency band, the sampling intervals corresponding to the particular frequency band may be determined easily.

In this invention, preferably, the fourth step is executed to derive an average intensity value from the group of interference light intensity values, obtain adjusted values by subtracting the average intensity value from the intensity values, respectively, and obtain new functions, as the characteristic functions, by substituting the adjusted values into a formula representing amplitude components of a waveform substantially extending through the adjusted values.

An average intensity value is derived from the group of interference light intensity values to determine a value of a centerline of the waveform showing the variations in the intensity values of interference light. Adjusted values are obtained by subtracting the average intensity value from the respective intensity values. Thus, the adjusted values form a group of values showing a waveform distributed across the centerline. This group of values is used to estimate the characteristic functions. These characteristic functions have a peak position substantially coinciding with a position where the waveform of the intensity values of interference fringes is at a maximum amplitude. Thus, the height in the particular location may be determined based on the peak position.

Further, since the height in the particular location is determined based on the peak position of the characteristic functions, height information may be obtained from a smaller amount of data and with higher precision than in the prior art.

In another aspect of this invention, a surface profile measuring apparatus for measuring rugged profiles of object surfaces, comprises:

a white light source for emitting white light to irradiate an object surface and a reference surface;

a varying device for varying a relative distance between the object surface and the reference surface;

a frequency band limiting device for limiting a frequency band of the white light emitted from the white light source to a particular frequency band;

an image pickup device for picking up an image of the object surface along with variations in interference fringes occurring with the variations in the relative distance between the object surface and the reference surface irradiated with the white light;

a sampling device having a function for acquiring intensity values of interference light from a plurality of particular locations on the object surface imaged, the sampling device acquiring interference light intensity values successively from each of the particular locations at sampling intervals corresponding to a bandwidth of the particular frequency band, the intensity values corresponding to variations in the interference fringes occurring with the variations in the relative distance between the object surface and the reference surface caused by the varying device;

a storage device having a function for storing a group of interference light intensity values acquired by the sampling device from each of the particular locations, the storage device storing the group of interference light intensity values acquired at the sampling intervals; and a computing device having a function for measuring the rugged profile of the object surface by deriving a height in each of the particular locations from the group of interference light intensity values stored in the storage device, the computing device estimating characteristic functions based on amplitude components of a theoretical waveform of intensity value variations derived from the group of interference light intensity values stored in the storage device, and determining the height in each of the particular locations based on a peak position of the characteristic functions estimated.

The white light source emits white light in a relatively broad frequency band. The frequency band limiting device limits the white light in that frequency band to a particular frequency band. As a result, the frequency band of the white light irradiating the object surface and the reference surface may be grasped. The varying device varies the relative distance between the object surface and the reference surface irradiated with the white light in the particular frequency band. The image pickup device picks up an image of the object surface along with interference fringes varying with an optical path difference between the white light reflected by the object surface and the white light reflected by the reference surface. This enables a grasp of how interference fringes are generated or varied according to the rugged profile of the object surface. The sampling device, in order to acquire the intensity values of interference light varying in a particular location on the object surface, successively collects the intensity values of interference fringes at sampling intervals corresponding to the bandwidth of the particular frequency band. In this way, the sampling device acquires a minimum number of intensity values of interference light based on the white light in the particular frequency band. The storage device successively receives the intensity values acquired by the sampling device, thereby storing a group of interference light intensity values for the particular location. The computing device derives a theoretical waveform of the intensity value variations of interference light for the particular location from the group of interference light intensity values, and estimates characteristic functions based on amplitude components of this waveform. Further, the computing device derives a height in the particular location on the object surface based on a peak position of the characteristic functions. The rugged profile of the object surface is measured by determining heights in a plurality of such particular locations on the object surface.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 11 is a table comparing measurement results by a method according to this invention and a method according to the prior art.

DESCRIPTION OF THE PREFERRED EMBODIMENTS

A preferred embodiment of this invention will be described in detail hereinafter with reference to the drawings.

Figure 1:
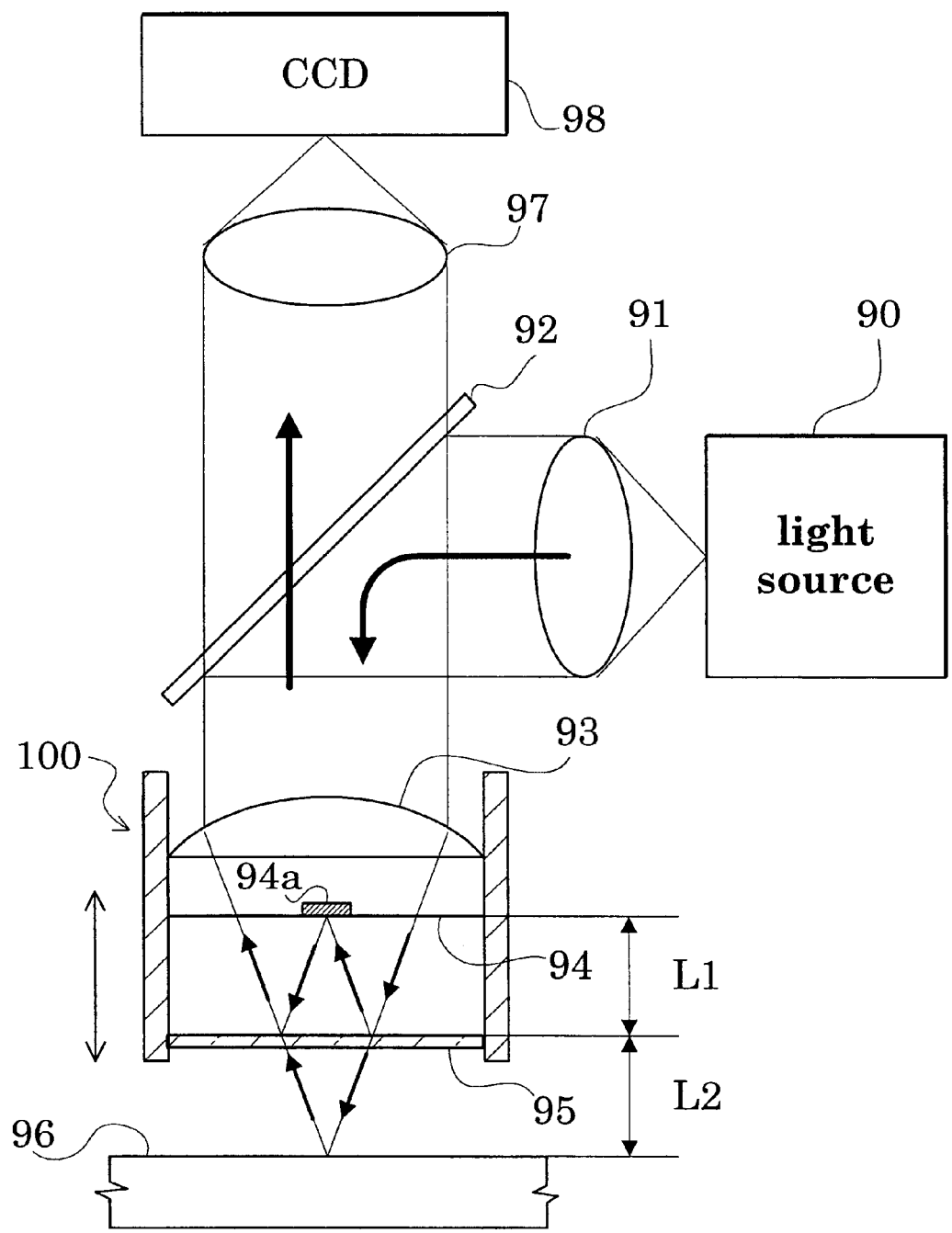
FIG. 1 is a view showing an outline of a surface profile measuring apparatus in the prior art.
Figure 2A:
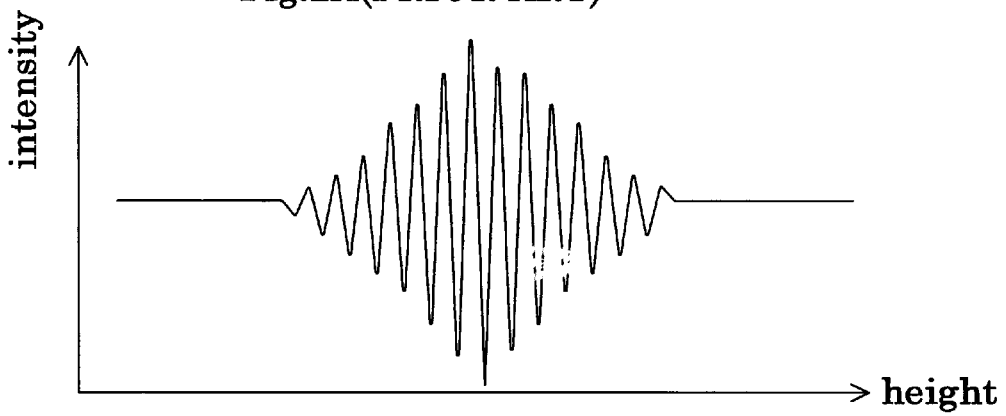
FIGS. 2A through 2D are schematic views showing a conventional way of determining a peak position in intensity values of interference light.
Figure 2B:
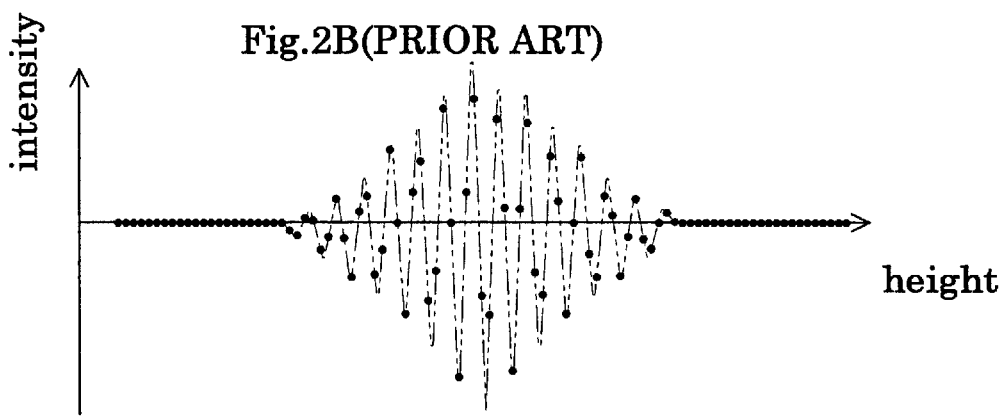
Figure 2C:
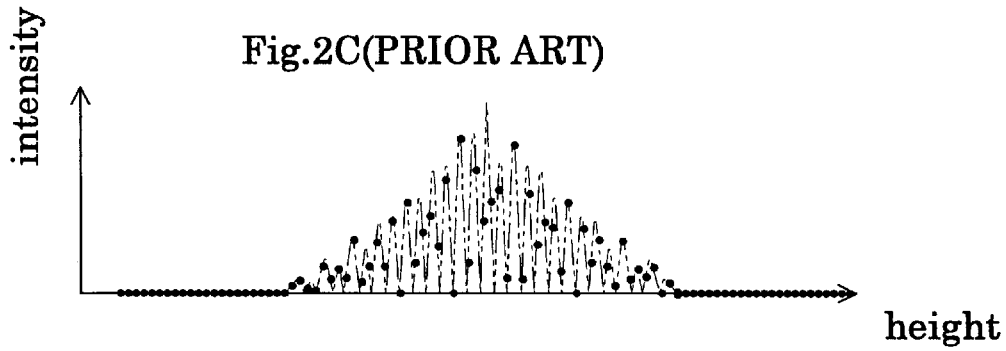
Figure 2D:
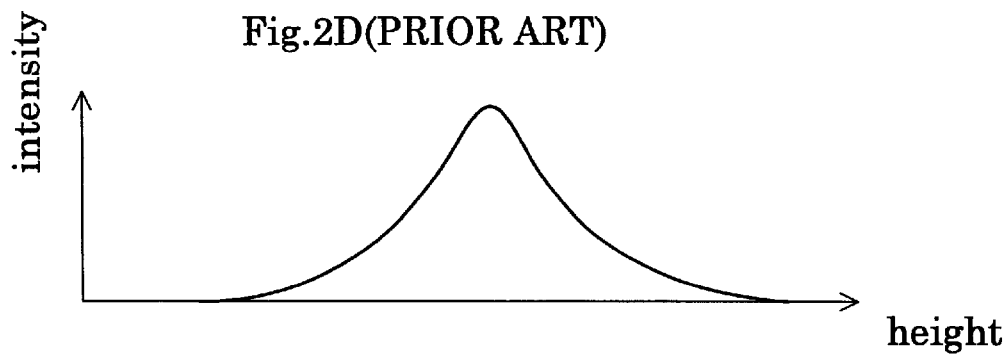
Figure 3:
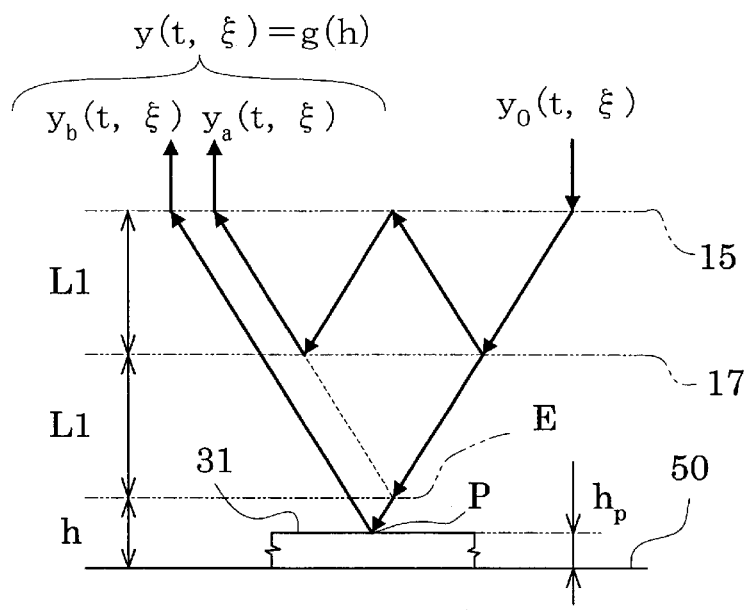
FIG. 3 is an explanatory view illustrating a mechanism of generating interference fringes.

First, the principle of this invention will be described to facilitate understanding thereof. FIG. 3 shows an enlarged view of a principal portion of an interferometer used in this invention. Particulars of each component will be described in relation to an embodiment hereinafter.

As shown in FIG. 3, it is assumed that the distance from a beam splitter 17 to a reference surface 15 is distance L1, and that a surface E lies at distance L1 from the beam splitter 17. It is further assumed that the interferometer is positioned at a height h from a sample table 50 to the surface E, and that a point P on a surface 31 to be measured of a sample is located at a height $h_P$ from the sample table 50. Further, the inverse of a wavelength in a vacuum multiplied by $2\pi$ is called a wave number which is expressed by k. The amplitude component of a light source for k is assumed a(k), and the refractive index of a medium is expressed by n.

The following definitions are adopted:

$$\omega = 2nk \tag{1}$$

and $$A(\omega) = a^2(k) = a^2(\omega/2n) \tag{2}$$

Then, g(h) which represents functions showing variations in the intensity value of interference light at point P is expressed as follows:

$$g(h) = f(h) + C \tag{3}$$

$$f(h) = (qs/n) \cdot \int A(\omega) \cos \omega(h-h_P) d\omega \tag{4}$$

$$C = [(q^2+s^2)/2n] \cdot \int A(\omega) d\omega \tag{5}$$

Figure 4:
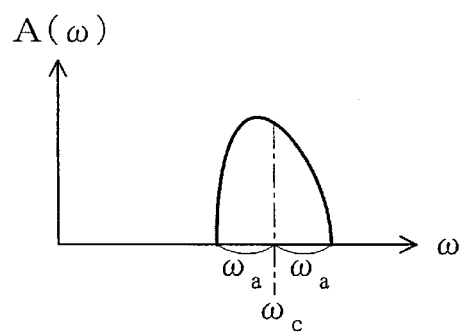
FIG. 4 is a schematic view showing a relationship between $A(\omega)$ and $\omega$.

$\int$: $-\infty$ to $\infty$ ($\int$ shows the same integration range unless otherwise indicated hereinafter)

q, s: damping factors due to reflection by and passage through the beam splitter $A(\omega)$ in expression (2), where, as shown in FIG. 4, it is distributed only over a frequency band in a range $2\omega_a$ across $\omega_c$, may be assumed by the following expression:

$$A(\omega) = 0 (\omega < \omega_c - \omega_a, \omega_c + \omega_a < \omega) \tag{6}$$

Such variations in the intensity value of interference light have the following characteristics. Functions g(h) are symmetrical across $h = h_P$, and $$g(h_P-h)=g(h_P+h) \quad (7)$$

g(h) becomes the greatest when $h=h_P$, and is expressed as follows with a give $h \neq h_P$:

$$g(h)<g(h_P) \quad (8)$$

It is seen from the above that functions showing a theoretical waveform of interference light may be estimated from the intensity values of interference light at point p, and a position where the functions are at a maximum may be determined as indicating a height hp at that point p.

Next, to search for the position where the functions. showing the above waveform of interference light are at a maximum, a huge number of calculations must be carried out as described in relation to the prior art. Thus, this invention employs a principle described below in order to search for height hp through a reduced number of calculations.

Functions g(h) showing the waveform of interference light appear to include intensely vibrating functions inwardly of gently varying functions. It is considered easier to determine a position where the gently varying functions are at their maximum, than to determine a position where the functions of interference light are at their maximum. Thus, only the gently varying functions (which are close to envelope functions but, strictly, are different therefrom, and will therefore be called "characteristic functions" hereinafter) are extracted from the functions of interference light, to determine a position of maximum functions. Its theory will be described hereinafter.

Characteristic functions r(h) are defined by the following expressions:

$$r(h)=[m_C^2(h)+m_S^2(h)]/2 \quad (9)$$

$$m_C(h)=(qs/n)\cdot\int A(\omega)\cos(\omega-\omega_c)(h-h_P)d\omega \quad (10)$$

$$m_S(h)=(qs/n)\cdot\int A(\omega)\sin(\omega-\omega_c)(h-h_P)d\omega \quad (11)$$

A function corresponding to a square of f(h) is shown by the following expression:

$$f^2(h)=[m_C^2(h)+m_S^2(h)]/2+[m_C^2(h)+m_S^2(h)]/2\cdot\cos 2\omega_c(h-h_P)-m_C^2(h)\cdot m_S^2(h)\cdot\sin 2\omega_c(h-h_P) \quad (12)$$

The first term which is, so to speak, a low frequency component of $f^2(h)$ above is characteristic function r(h).

Though not shown here, it is theoretically proved that the function r(h) becomes the greatest at $h=h_P$, where the function g(h) becomes the greatest. That is, for given $h=h_P$, the following expression may be established:

$$r(h)<r(h_P) \quad (13)$$

Further, the following characteristic is derived from the above results:

$$r(h-h_P)=r(h_P+h) \quad (14)$$

A way of estimating characteristic functions from values sampled from the intensity values of interference light will be described below. First, a waveform showing variations in the intensity value of interference light is shown to be subjected to a band limitation of the bandpass type, and a sampling theorem is obtained for the variations in the intensity value of interference light. From this, functions showing the variations in the intensity value of interference light are obtained, and from these functions, characteristic functions are obtained, which will be described below.

The frequency band of the white light irradiating the object surface 31 and the reference surface 15 is checked. Fourier transform f'(ω) of function f(h) is defined by the following expression:

$$f'(\omega)=\int f(h)e^{-jwh}dh \quad (15)$$

Since g(h) in expression (3) includes a constant term, a Fourier transform thereof is impossible. Thus, a Fourier transform of f(h) in expression (4) is obtained.

The Fourier transform of f(h) is given by the following expression:

$$f'(\omega)=(qs\pi/n)\cdot e^{-jwhP}[A(\omega)-A(-\omega)] \quad (16)$$

Based on expressions (6) and (16), the frequency band of f(h) is expressed as follows:

$$f'(\omega)=0(|\omega|<\omega_c-\omega_a, \omega_c+\omega_a<|\omega|) \quad (17)$$

Figure 5:
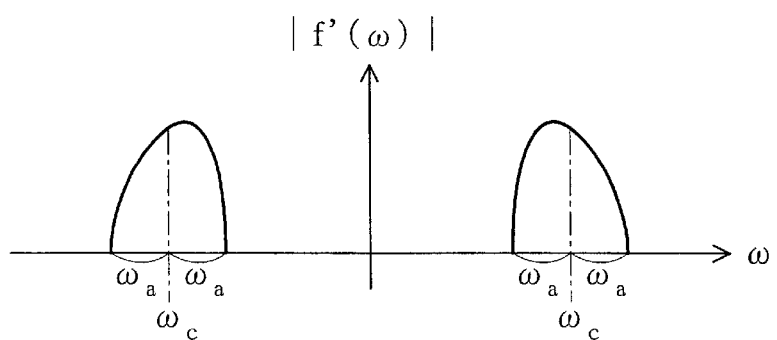
FIG. 5 is a schematic view showing a relationship between $f'(\omega)$ and $\omega$.

FIG. 5 shows a band limitation to function f(h). As seen from FIG. 5, not only high frequency components but also low frequency components are zero. Such a band limitation is called the bandpass type. Based on the above, a bandpass type sampling theorem is applied to function f(h). The bandpass type sampling theorem is disclosed in R. J. Marks: Introduction to Shannon Sampling and Interpolation Theory, Springer-Verlag, New York (1991).

Function f(h) may be expressed as follows using sampling value $\{f(h_m)\}$ (m=−∞ to ∞):

$$f(h)=\Sigma f(h_m)\phi_m(h) \quad (18)$$

Σ: sum total from m=−∞ till m=∞.

Here, I is assumed to be a positive integer, and ωa' and ωc' assumed to be real numbers satisfying the following conditions:

$$\omega_c-\omega_a'\leq\omega_c'-\omega_a, \omega_c+\omega_a\leq\omega_c'-\omega_a' \quad (19)$$

$$\omega_c'(2I+1)\omega_a' \quad (20)$$

Sampling intervals ΔB of $\{h_m\}$ (m=−∞ to ∞) are given by the following expression:

$$\Delta B=\pi/2\omega_a' \quad (21)$$

With the above, a given sampling point is expressed as follows:

$$h_m=(m-1)\Delta B \quad (22)$$

$\phi_m(h)$ is given by the following expression:

$$\phi_m(h)=\sin c[\omega_a'(h-h_m)/\pi]\cos\omega_c'(h-h_m) \quad (23)$$

To derive waveform functions of interference light from expression (18), an infinite number of sampled values $\{f(h_m)\}$ (m=−∞ to ∞) is required for f(h). However, the data $\{z_m\}$ (m=1 to M) acquired from the interferometer are sampled values of g(h)(=f(h)+C), and that in a finite number. Thus, instead of $\{f(h_m)\}$ (m=1 to M), $\{y_m\}$ (m=1 to M) is defined for estimated value C' of C.

$$y_m=z_m-C' \quad (24)$$

Here, the infinite series in expression (18) is limited to the first M terms. Function $f_B(h)$ thereby obtained is given by the following expression:

$$f_B(h)=\Sigma y_m\phi_m(h) \quad (25)$$

Σ: sum total from m=1 till m=M

This $f_B(h)$ is used as functions for the waveform of interference light.

As characteristic functions r(h) are estimated from f(h), the low frequency components of the square of $f_B(h)$ in expression (25) are expressed as $r_B(h)$ and used as estimated values of the characteristic functions. Estimated value $r_B(h)$ of this characteristic function r(h) is given by the following expressions:

Where h is not a sampling point:

$$r_B(h)=1/(4\omega_a'^2)\{[1-\cos 2\omega_a'h][\Sigma'(y_{2m-1}/(h-h_{2m-1}))]^2+[1+\cos 2\omega_a'h][\Sigma''(y_{2m}/(-h_{2m}))]^2\} \quad (26)$$

Σ': sum total from (m=1) till (minimum integer of M/2 or more)

Σ'': sum total from (m=1) till (maximum integer of M/2 or less)

Where h is a sampling point, that is where $h=h_J$ (J is an integer $1 \leq J \leq M$):

$$r_B(h)=1/(2\omega_a'^2)\{(\omega_a'y_J)^2+[\Sigma'''(y_{J+2m+1}/(h_J-h_{J+2m+1}))]^2\} \quad (27)$$

Σ''': sum total from −(maximum integer of m=J/2 or less) till (minimum integer of [[M−J]/2 or more]−1)

As understood from expressions (26) and (27) and expressions (23) and (25), the calculation of sinc necessary for calculating $f_B(h)$ is no longer necessary, and the calculation of cos may be done only once regardless of sampling points. Further, where h coincides with the sampling point, the calculation of cos also is unnecessary, and only algebraic computations are required.

To facilitate understanding of the principle of this invention further, a comparison in principle will be made with the prior art.

Maximum sampling intervals ΔC used in a conventional method are shown by the following expression:

$$\Delta C=\pi/[2(\omega_c+\omega_a)] \quad (28)$$

An accurate height cannot be determined unless values are sampled at smaller intervals than sampling intervals ΔC.

In this invention, the sampling intervals are as shown in expression (21). Intervals ΔB and ΔC are in a relationship shown by the following expression:

$$\Delta B=[(\omega_c+\omega_a)/(\omega_c'+\omega_a')\cdot 2\cdot (I+1)\Delta C \quad (29)$$

Therefore, when $(\omega_c+\omega_a)/(\omega_c'+\omega_a')$ is regarded as 1, ΔB is 2(I+1) times ΔC.

On the other hand, where a sampling theorem of the low pass type is used, sampling intervals AL are given by the following expression:

$$\Delta L=\pi/(\omega_c+\omega_a) \quad (30)$$

Values must be sampled at smaller intervals than sampling intervals ΔL.

From expressions (20), (21) and (30), ΔB may be expressed as follows:

$$\Delta B=[(\omega_c+\omega_a)/(\omega_c'+\omega_a')](I+1)\Delta L \quad (31)$$

Therefore, when $(\omega_c+\omega_a)/(\omega_c'+\omega_a')$ is regarded as 1, ΔB is (I+1) times ΔL.

By applying a band limitation of the bandpass type to f(h), sampling may be made at increased intervals. For example, in an experiment example described hereinafter, ΔB is about 13 times ΔL, and about 25 times ΔC.

An embodiment of this invention will particularly be described hereinafter with reference to the drawings.

Figure 6:
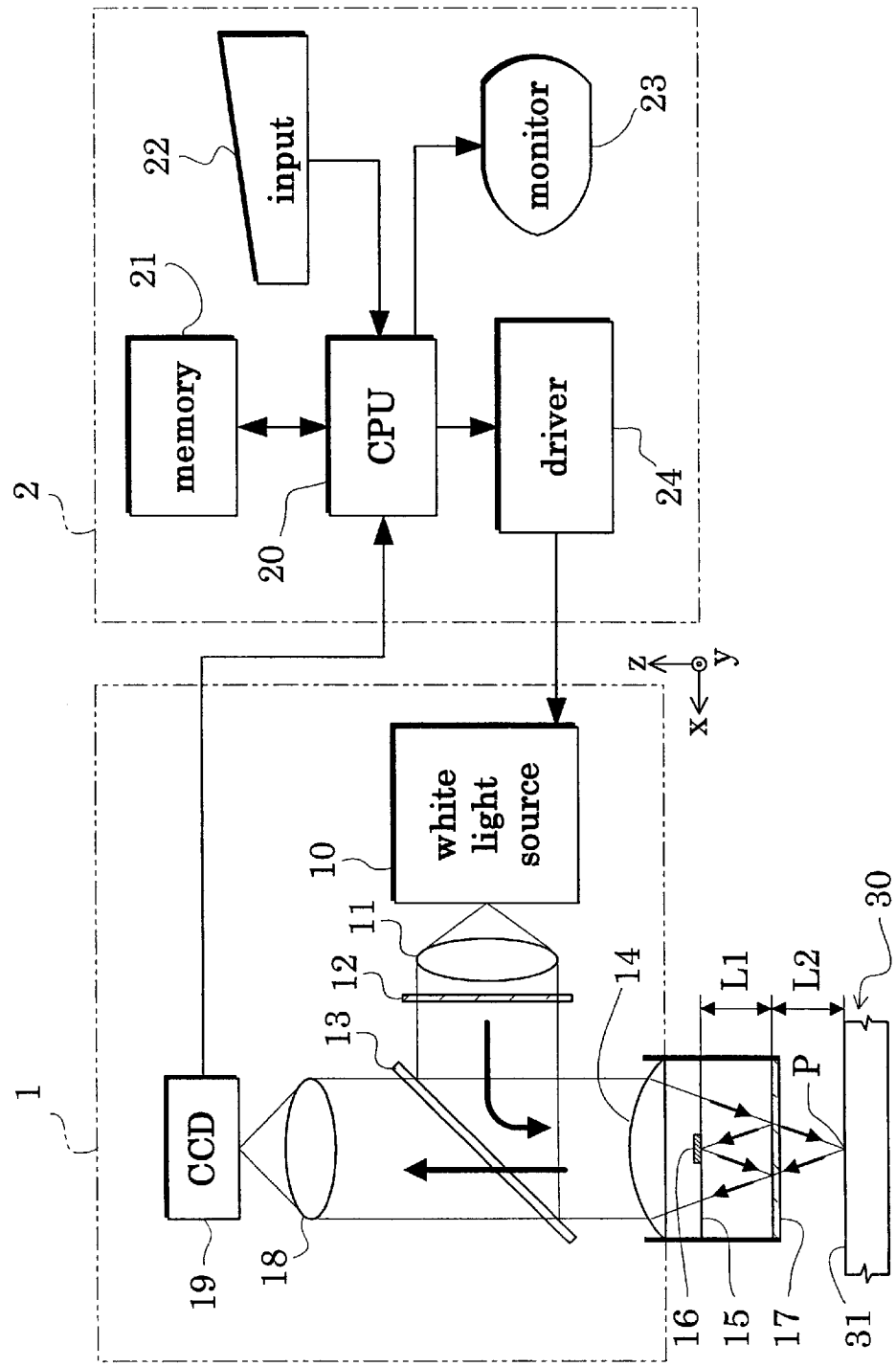
FIG. 6 is a view showing an outline of a surface profile measuring apparatus embodying this invention.

FIG. 6 is a view showing an outline of a surface profile measuring apparatus according to this invention. This surface profile measuring apparatus includes an optical unit 1 for irradiating, with white light in a particular frequency band, minute patterns formed on a surface 31 to be measured of an object 30 such as a semiconductor wafer, glass substrate, metal substrate or the like. The apparatus further includes a control unit 2 for controlling the optical unit 1.

The optical unit 1 has a white light source 10 for emitting the white light to irradiate the object surface 31 and a reference surface 15, a collimator lens 11 for collimating the white light from the white light source 10 into parallel rays, a bandpass filter 12 for passing only white light in the particular frequency band, a half mirror 13 for reflecting the white light emerging from the bandpass filter 12 toward the object 30, and passing white light returning from the object 30, an objective lens 14 for condensing the white light reflected by the half mirror 13, a beam splitter 17 for dividing the white light having passed through the objective lens 14 into reference light to be reflected by the reference surface 15 and measuring light for irradiating the object surface 31, and for joining the reference light reflected by the reference surface 15 and the measuring light reflected by the object surface 31 to produce interference fringes, a mirror 16 for reflecting the reference light on the reference surface 15, an imaging lens 18 for forming an image of the white light joining the reference light and measuring light, and a CCD camera 19 for photographing the object surface 31 along with the interference fringes.

The white light source 10 is in the form of a white light lamp, for example, which emits white light in a relatively broad frequency band. The white light emitted from the white light source 10 is made into parallel rays by the collimator lens 11 to enter the bandpass filter 12.

The bandpass filter 12 allows passage of only white light in the particular frequency band, and is disposed on an optical path extending from the white light source 10 to the CCD camera 19. Preferably, the bandpass filter 12 is disposed on an optical path extending from the white light source 10 to a position where the white light is divided into the reference light directed to the reference surface 15 and the measuring light directed to the object surface 31.

In this embodiment, the bandpass filter 12 is disposed on an optical path between collimator lens 11 and half mirror 13. The bandpass filter 12 employed herein is, for example, an optical interference filter of the bandpass type with a 630.9 nm center wavelength and a 38 nm bandwidth. The white light in the relatively broad frequency band incident on the bandpass filter 12 has the frequency band narrowed, whereby only white light in the particular frequency band passes through the bandpass filter 12.

The half mirror 13 is provided for reflecting the white light in the particular frequency band emerging from the bandpass filter 12 toward the object 30 to be measured, and passing the white light returning from the object 30. The white light in the particular frequency band reflected by the half mirror 13 enters the objective lens 14.

The objective lens 14 is provided for condensing the incident white light toward a point P. The white light condensed by the objective lens 14 passes through the reference surface 15 and reaches the beam splitter 17.

The beam splitter 17 divides the white light condensed by the objective lens 14 into the reference light which is reflected, for example, by an upper surface of the beam splitter 17, to be reflected by the reference surface 15, and the measuring light which passes through the beam splitter 17 to be reflected by the object surface 31. The beam splitter 17 also joins the reference light and measuring light together again to produce interference fringes. Thus, the white light reaching the beam splitter 17 is divided into the reference light reflected by the upper surface of beam splitter 17 and the measuring light passing through the beam splitter 17. The reference light reaches the reference surface 15, while the measuring light reaches the object surface 31.

The mirror 16 is disposed on the reference surface 15 for reflecting the reference light toward the beam splitter 17. The reference light reflected by the mirror 16 reaches the beam splitter 17 and is further reflected by the beam splitter 17.

The measuring light having passed through the beam splitter 17 is condensed toward point P and reflected by the object surface 31. The measuring light reflected reaches the beam splitter 17 and passes through the beam splitter 17.

The beam splitter 17 joins the reference light and measuring light together again. At this time, an optical path difference occurs from a difference between the distance L1 between reference surface 15 and beam splitter 17, and the distance L2 between beam splitter 17 and object surface 31. The reference light and measuring light interfere with each other in accordance with the optical path difference, thereby producing interference fringes. The white light with the interference fringes passes through the half mirror 13, has an image thereof formed by the imaging lens 18, and enters the CCD camera 19.

The CCD camera 19 photographs the image of the white light with the interference fringes and of the object surface 31 adjacent the point P picked up by the measuring light. Image data thereby acquired are collected by the control unit 2.

As will be clear from the following description, the optical unit 1 is moved, for example, up and down and right and left by a driver 24 included in the control unit 2 and corresponding to the varying device of this invention. The distance L1 and distance L2 are variable particularly with a vertical movement of the optical unit 1. As a result, the interference fringes vary gradually with a difference between distance L1 and distance L2. The CCD camera 19 acquires an image of the object surface 31 along with variations of the interference fringes at each predetermined sampling interval described hereinafter. The resulting image data are collected by the control unit 2. The CCD camera 19 corresponds to the image pickup device of this invention.

The control unit 2 is in the form of a computer system having a CPU 20 for generally controlling the surface profile measuring apparatus and performing predetermined computing processes, a memory 21 for storing the image data collected successively by CPU 20 and various data such as results of. computations performed by CPU 20, an input device 22 including a mouse and a keyboard for inputting sampling intervals and other setting information, a monitor 23 for displaying images of the object surface 31 and other information, and the driver 24 formed of a drive mechanism such as a servo motor of the three-axis drive type for driving the optical unit 1 up and down and right and left in response to instructions from CPU 20.

The CPU 20 corresponds to the sampling device and computing device of this invention. The memory 21 corresponds to the storage device of this invention. The driver 25 corresponds to the varying device of this invention.

The CPU 20 is what is known as a central processing unit for controlling CCD camera 19, memory 21 and driver 24, and carries out a process for determining a rugged profile of the object surface 31, based on image data of the object surface 31 including interference fringes acquired by CCD camera 19. This process will be described in detail later.

Further, the CPU 20 has, connected thereto, the monitor 23 and the input device 22 including a keyboard and a mouse. The operator inputs various setting information from the input device 22 while observing operation screens displayed on the monitor 23. After a measurement of the object surface 31 is completed, the rugged profile of the object surface 31 is displayed in numerical values and/or as an image on the monitor 23.

The driver 24 is a device for moving the optical unit 1 in three orthogonal directions in order to vary the difference between fixed distance L1 between reference surface 15 and beam splitter 17, and variable distance L2 between beam splitter 17 and object surface 31. The driver 24 is formed of a drive mechanism having a servo motor of the three-axis drive type for driving the optical unit 1 along X-, Y- and Z-axes upon instructions from CPU 20.

The driver 24 corresponds to the varying device of this invention. The relative distance in this invention refers to the distance from the reference surface 15 to the object surface 31, i.e. distance L1 and distance L2. In this embodiment, the optical unit 1 is constructed movable. However, for example, a table, not shown, for supporting the object 30 to be measured may be moved in three orthogonal directions.

Figure 7:
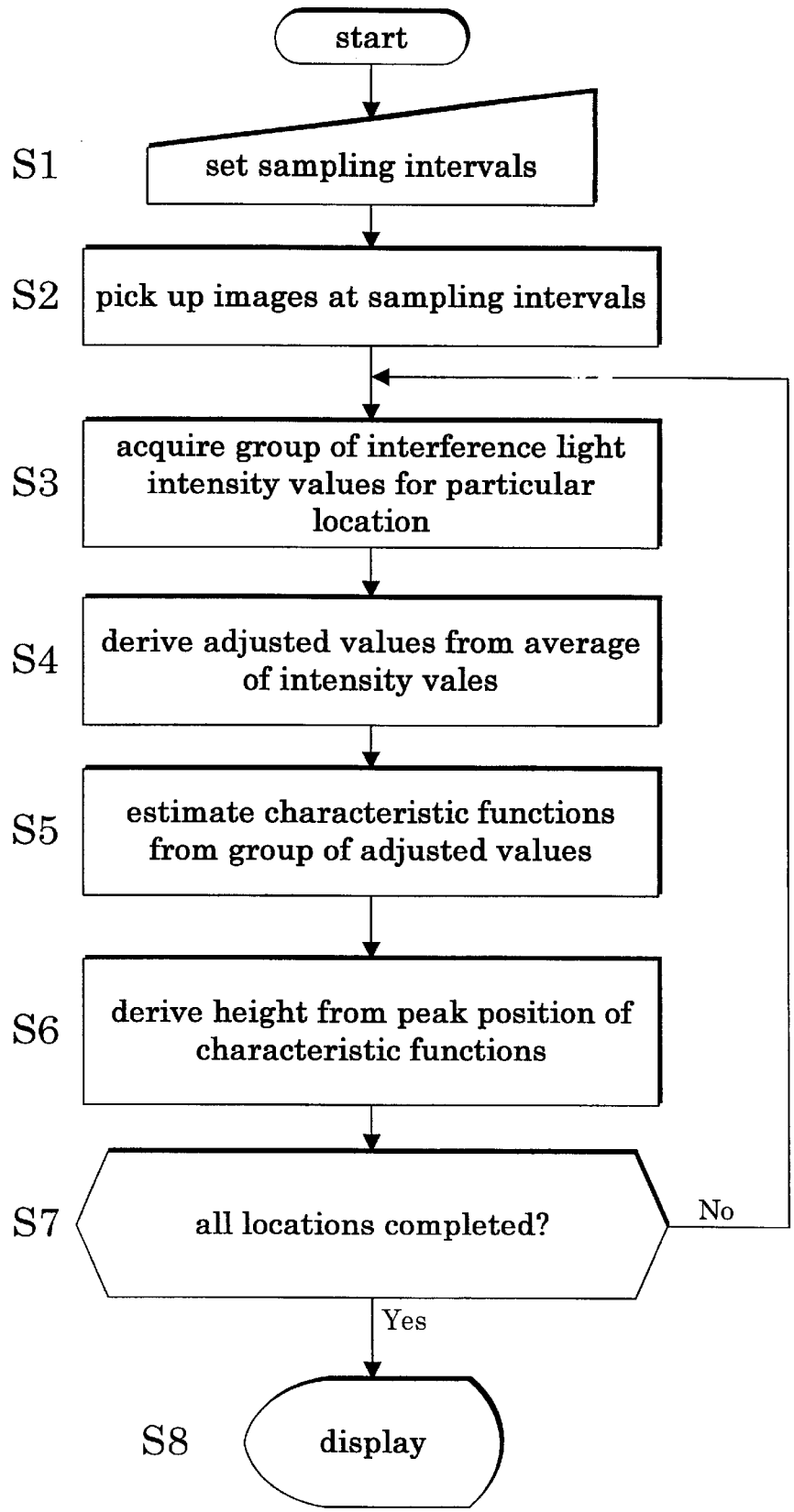
FIG. 7 is a flow chart of a processing sequence of the surface profile measuring apparatus.

A process performed by the entire surface profile measuring apparatus in this embodiment will be described hereinafter with reference to the flow chart shown in FIG. 7.

Step S1 (set sampling intervals):

First, $\omega_a'$ satisfying the conditions in expressions (19) and (20) is determined, and sampling intervals $\Delta B$ are derived from $\omega_a'$. Specifically, since a minimum interval of movement which is a driving precision for the optical unit 1 of the surface profile measuring apparatus is 0.00927 $\mu m$, for example, the sampling intervals $\Delta B$ should be made a multiple of 0.00927 $\mu m$.

Where, the white light with the particular frequency band limited by the bandpass filter 12 has a center wavelength of 0.6309 $\mu m$ and a bandwidth of 0.038 $\mu m$ and the refractive index in a medium is n=1, $\omega_a$=0.60 (1/$\mu m$), and $\omega_c$=4$\pi$/0.6309=19.94 (1/$\mu m$). The surface profile is measured by using $\omega_a$=0.79 (1/$\mu m$), $\Delta B$=1.98($\mu m$) and I=12 as values satisfying all these conditions. The operator inputs directly the value of $\Delta B$, or inputs a set value for setting $\Delta B$ from the input device 22. From upper limit wavelength=0.6309+(0.038/2)=0.6499, upper limit frequency=$\omega_c+\omega_a$=20.54. From lower limit wavelength=0.6309−(0.038/2)=0.6119, lower limit frequency=$\omega_c-\omega_a$=19.34.

Step S2 (pick up images at sampling intervals):

The optical unit 1 irradiates the object surface 31 and the reference surface 15 with the white light emitted from the white light source 10 and limited to the particular frequency band by the bandpass filter 12. The process up to the limitation to the particular frequency effected by the bandpass filter 12 or by the optical system for dividing the white light into the measuring light and the reference light to be described later corresponds to the first step in this invention.

The CPU 20 gives the driver 24 a move starting instruction for starting a movement along z-axis of the optical unit 1 which has been moved to a predetermined measuring position before-hand. The driver 24 drives a drive system such as a stepper motor, not shown, to move the optical unit 1 a predetermined distance along z-axis. This varies the relative distance between the reference surface 15 and object surface 31. This step corresponds to the second step in this invention.

Each time the optical unit 1 moves by sampling interval ΔB, the CPU 20 collects image data of the object surface 31 including interference fringes acquired through the CCD camera 19, and successively stores the data in the memory 21. With the optical unit 1 moving a predetermined distance, the memory 21 receives and stores a plurality of image data determined by the distances of movement of the optical unit 1 and sampling intervals ΔB.

Step S3 (acquire group of interference light intensity values for particular location):

The operator, while observing the object surface 31 displayed on the monitor 23, for example, operates the input device 22 to input a plurality of locations where heights of the object surface 31 are to be measured. The CPU 20 grasps the plurality of locations inputted, and fetches, from the plurality of image data, density values of pixels corresponding to the particular locations, i.e. intensity values of the interference light in the particular location, on an image picked up of the object surface 31. Consequently, a plurality M of intensity values are obtained for each particular location. These M intensity values are called a group of interference light intensity values, and expressed as $\{z_m\}$ (m=1 to M). This step corresponds to the third step in this invention.

Figure 8A:
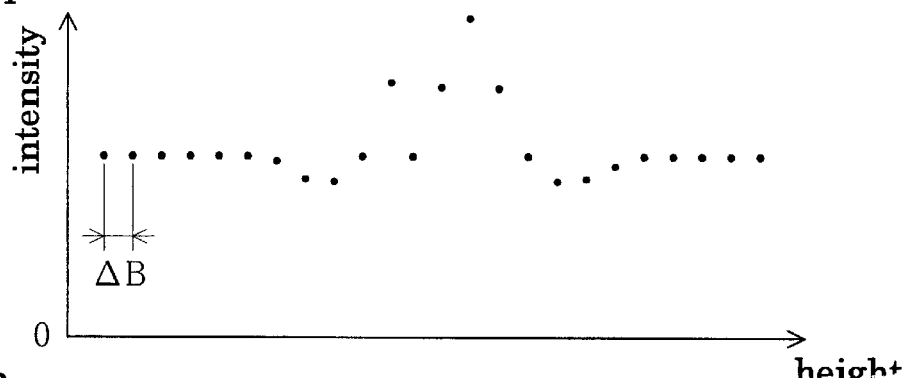
FIGS. 8A through 8D are schematic views showing a way of determining a peak position in intensity values of interference light according to this invention.
Figure 8B:
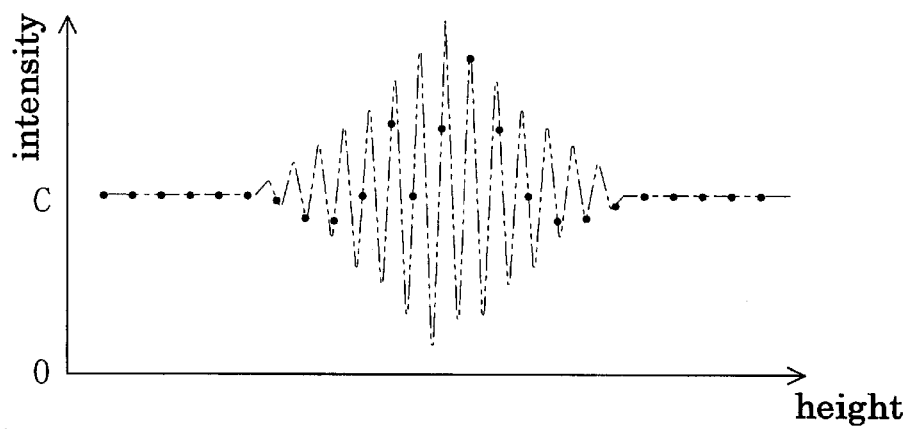

As a result of step S3, as shown in FIG. 8A, M intensity values are acquired at relatively large sampling intervals. As shown in FIG. 8B, these M intensity values are distributed over a waveform showing variations in the intensity value of interference light in the particular location according to the interference fringes based on the white light in the particular frequency band.

Step S4 (derive adjusted values from average of intensity values):

Based on the group of interference light intensity values for the particular location, the CPU 20 determines an estimated value C' as noted hereinbefore which is an average of the intensity values of the interference light. Further, the CPU 20 derives adjusted values (group of adjusted values) each by subtracting the average value from each intensity value in the group of interference light intensity values. The estimated value C' is derived from the following expression:

$$C'=(1/M)\cdot\Sigma z_m \qquad (32)$$

Further, $\{y_m\}$ (m=1 to M) which is the group of adjusted values is derived from expression (24).

Figure 8C:
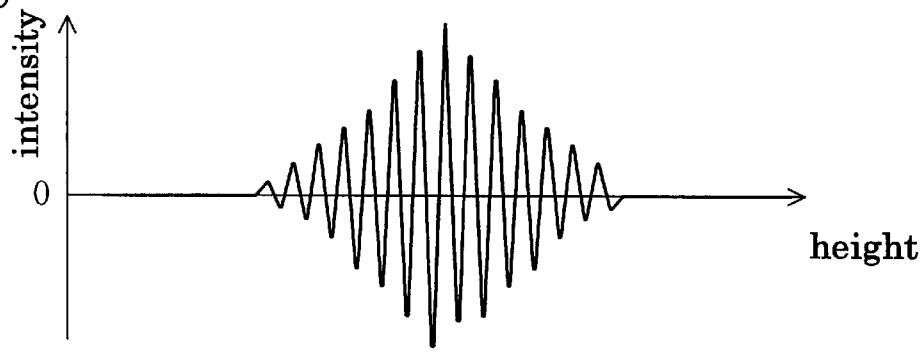
Figure 8D:
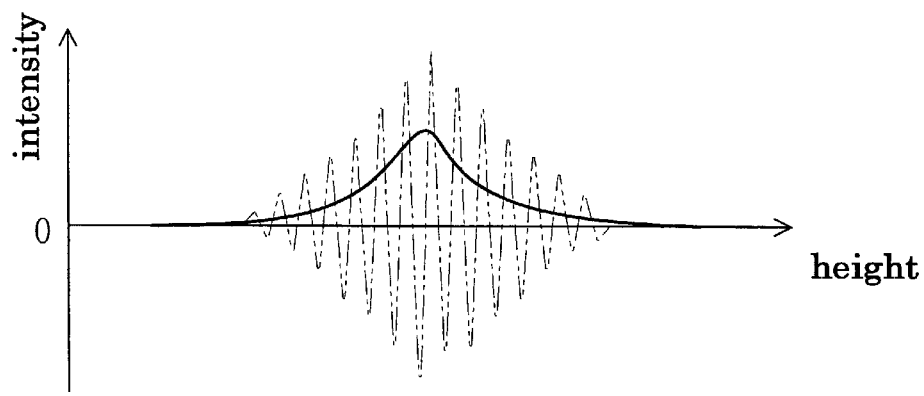

Step S5 (estimate characteristic functions from group of adjusted values):

The CPU 20 estimates characteristic functions $r_B(h)$, $r_B(h_j)$ by substituting the group of adjusted values $\{y_m\}$ (m=1 to M) obtained at step S4, into expression (26) or (27). FIG. 8C shows f(h) in expression (4) derived from the group of adjusted values $\{y_m\}$ (m=1 to M). As shown in FIG. 8C, f(h) is represents theoretical functions expressed by a waveform passing through the adjusted values $\{y_m\}$ (m=1 to M) and vibrating intensely up and down around the estimated value C' within a low-frequency function. The characteristic functions $r_B(h)$, $r_B(h_j)$ (hereinafter called simply "characteristic functions"), as shown in FIG. 8D, are functions having a peak position coinciding with the peak position of f(h). Steps S4 and S5 constitute the fourth step in this invention.

Figure 9:
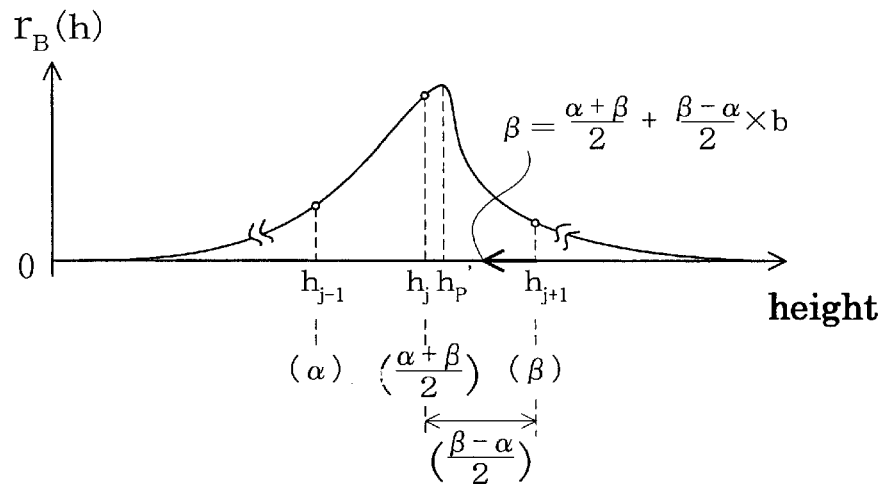
FIG. 9 is an explanatory view illustrating a process of determining a peak position of characteristic functions.
Figure 10:
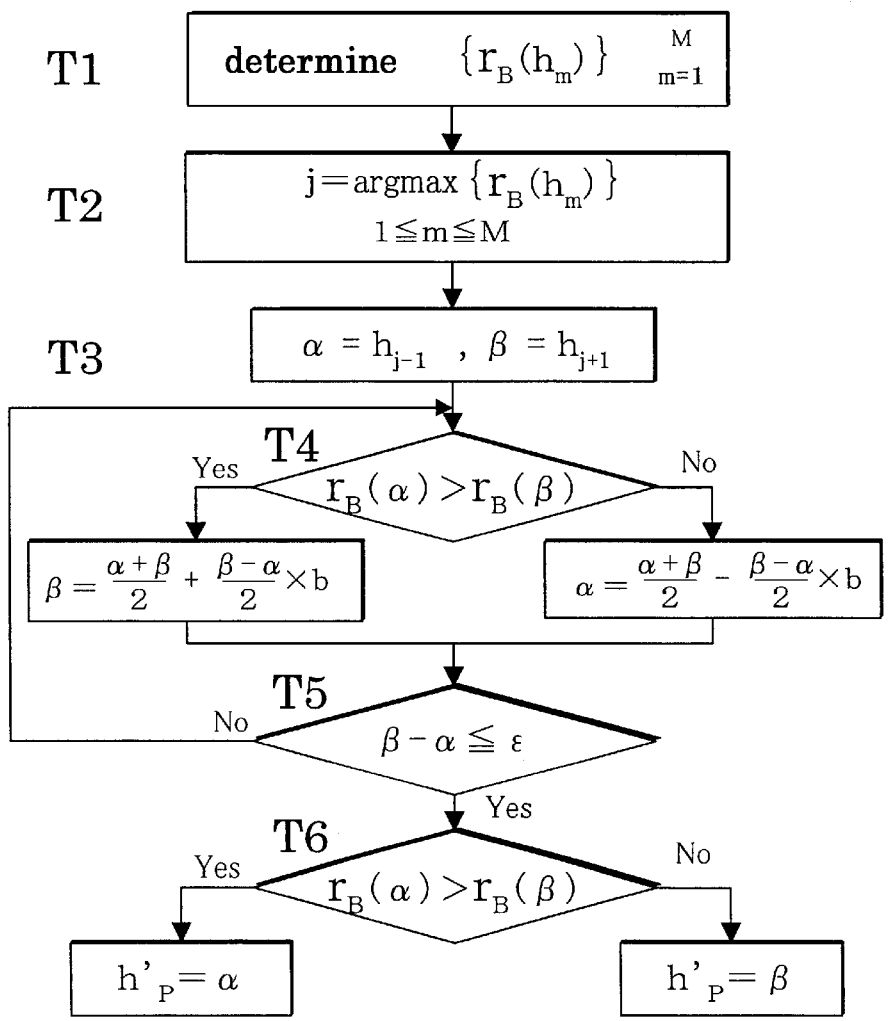
FIG. 10 is a flow chart showing the process of determining the peak position of the particular functions.

Step S6 (derive height from peak position of characteristic functions):

To determine a peak position where the characteristic functions are at their maximum, the CPU 20 performs a process shown in the flow chart of FIG. 10. Specifically, to guess peak position $h_P'$ first, expression (27) is used to determine a group of characteristic function values $\{r_B(h_m)\}$ (m=1 to M) for all sampling points (step T1). As shown in FIG. 9, the peak position $h_P'$ of the value group $\{r_B(h_m)\}$ (m=1 to M) is found near value hj that maximizes $\{r_B(h_m)\}$ (m=1 to M). Then, a search is made between values $h_{j-1}$ and $h_{j+1}$ at opposite sides of value hj (step T2). It is assumed here that $\alpha=h_{j-1}$ and $\beta=h_{j+1}$ (step T3). Next, the CPU 20 performs a process from step T4 to step T6 for a modified dichotomizing search at the two points.

When $R_B(\alpha)>r_B(\beta)$, $\beta=(\beta+\alpha)/2+(\beta-\alpha)/2\times b$. Here, b is a real number $0\leq b<1$. If $r_B(h)$ were symmetrical, a peak position could be determined from $\beta=(\beta+\alpha)/2$ based on an ordinary dichotomizing search. However, since $r_B(h)$ is not symmetrical, β would become smaller than peak position $h_P'$.

Thus, the range of search is enlarged by $(\beta-\alpha)/2\times b$. On the other hand, if $R_B(\alpha)<r_B(\beta)$, α and β are exchanged to perform a similar process. By repeating this process, α and β are brought close to the peak position $h_P'$. When $\beta-\alpha$ becomes smaller than value ε representing the precision required for the search, the repetition of the process is discontinued. Then, α or β with the larger value of $R_B(h)$ is adopted as a value of peak position $h_P'$. This value serves as information on the height of peak position $h_P'$. The larger the value of b is, the better for coping with $r_B(h)$ of collapsed symmetry.

However, since a correspondingly increased amount of calculations is needed, care should be taken in selecting appropriate b. Where, for example, the number of sampling points M=14, the optical unit 1 is moved by a distance 27 μm, ε=0.000001 cm, and b=0.2, a peak position may be determined by calculating expression (27) 14 times and expression (26) 28 times. Step S6 corresponds to the fifth step in this invention.

Step S7 (all locations completed?):

The CPU 20 repeats the process at steps S3–S6 until all the particular locations have been dealt with, to determine heights of all the particular locations.

Step S8 (display):

The CPU 20 causes the monitor 23 to display information on the heights of the particular locations, and/or three-dimensional or two-dimensional images based on the information on the heights of the particular locations. By observing these displays, the operator may grasp a rugged profile of the surface 31 of object 30.

The above embodiment uses white light with a limited frequency band, and samples variations in the intensity value of interference light at least in particular locations at sampling intervals based on the frequency band of white light. Characteristic functions are derived directly from these intensity values, and a height of each particular location is determined based on a peak position having the greatest characteristic function. Consequently, a rugged profile of an object surface may be measured from a reduced amount of data and with increased precision.

Further, since the amount of data required for determining a height of each particular location is reduced, a reduced storage capacity may be used for storing the data. Thus, the surface profile measuring apparatus may be manufactured at reduced cost.

It will be seen from the above embodiment that this invention has a characterizing feature in introducing the concept of characteristic functions that are far smoother than a waveform showing variations in the intensity value of interference light, and that reaches their maximum in the same position as the intensity values. This feature allows a position of maximum intensity value of interference light to be determined more simply than in the prior art.

Next, a high precision waveform model showing variations in the intensity values of interference light has been obtained to prove that the bandwidth is limited not only to the lowpass type but also to the bandpass type. An expression for directly estimating characteristic functions from measurement data is derived from a sampling theorem utilizing the above characteristic. A rugged profile of an object surface is measured by determining a position of maximum characteristic function based on this expression. As will be appreciated from the results of experiment described below, measurement may be performed faster than in the prior art.

The experiment results will now be described which compare results of experiment with the method of this invention and those of experiment with a conventional method.

A sample object measured in the experiment had a 9.947 $\mu$m standard deviation which was a known level difference between higher surface portions and lower surface portions. For the measurement, 200 particular locations were selected, i.e. 100 locations from the higher portions and 100 from the lower portions. The measurement was made in a range of 27 $\mu$m from the height of the first sampling point regarded as 0.

For the method of this invention, sampling intervals were set to 1.98 $\mu$m as noted hereinbefore. For the conventional method, sampling intervals were set to two different values, i.e. 0.08 $\mu$m and 0.24 $\mu$m. The measurement results are shown in the table in FIG. 11.

As seen from the table, the relative error in the mean level difference is 8.2% for the 0.24 $\mu$m sampling intervals, and 5.54% for the 0.08 $\mu$m sampling intervals, both in the conventional method. In this invention, on the other hand, the relative error is 0.21% for the 1.98 $\mu$m sampling intervals.

The above results show that this invention achieves an improvement on the prior art despite the larger sampling intervals than in the prior art. Next, to compare in standard deflection of level difference with the conventional 0.24 $\mu$m intervals, the sampling intervals may be enlarged to 8.2 times while maintaining the standard deflection at 1.5 times. Compared with the conventional 0.08 $\mu$m intervals, the sampling intervals may be enlarged to 23.8 times while maintaining the standard deflection at 3.75 times.

In the embodiment described above, the intensity values of interference light in a particular location are acquired after collecting image data from the object surface 31. This invention is not limited to such a sequence. For example, intensity values of a pixel in the collected image data corresponding to the particular location may be acquired in real time, these intensity values of interference light being stored successively in the memory 21.

In the above embodiment, the frequency band of the white light emitted from the white light source is limited to the particular frequency band by the band-pass filter 11. This invention is not limited to such a feature. It is possible to grasp beforehand a frequency band to which the white light from the white light source is limited by the optical system (which includes the light source, lenses and mirrors) extending to the CCD camera 19 acting as the image pickup device. This limited frequency band may be adopted as the particular frequency band in this invention.

In the above embodiment, the frequency band of the white light emitted from the white light source is limited to the particular frequency band by the band-pass filter 11. This invention is not limited to such a feature. It is possible to grasp beforehand a frequency band to which the white light is limited by frequency characteristics of CCD camera 19 acting as the image pickup device. This limited frequency band may be adopted as the particular frequency band in this invention.

In the above embodiment, the CCD camera 19 is used as the image pickup device. However, since only the intensity values of interference light in particular locations are picked up (detected), the image pickup device may, for example, be in the form of a linear or planar photodetector.

The present invention may be embodied in other specific forms without departing from the spirit or essential attributes thereof and, accordingly, reference should be made to the appended claims, rather than to the foregoing specification, as indicating the scope of the invention.

What is claimed is:

1. A surface profile measuring method for measuring rugged profiles of object surfaces, wherein interference fringes are produced by varying a relative distance between an object surface and a reference surface while irradiating the two surfaces with white light from a white light source, variations in intensity value of interference light occurring at this time are measured for a plurality of particular locations on the object surface, and heights in the particular locations are derived from a group of interference light intensity values acquired from each particular location, said method comprising the steps of:

limiting a frequency band of the white light from said white light source to a particular frequency band;

varying the relative distance between said object surface and said reference surface irradiated with the white light in said particular frequency band;

acquiring a group of interference light intensity values which are successively collected from each of said particular locations on said object surface at sampling intervals corresponding to a bandwidth of said particular frequency band, said intensity values corresponding to variations in the interference fringes occurring with variations in the relative distance between said object surface and said reference surface;

estimating characteristic functions based on amplitude components of a theoretical waveform of intensity value variations derived from said group of interference light intensity values; and determining a height in each of said particular locations based on a peak position of the characteristic functions estimated.

2. A surface profile measuring method as defined in claim 1, wherein said acquiring step is executed with said sampling intervals determined by dividing $\pi$ by said bandwidth of said particular frequency band.

3. A surface profile measuring method as defined in claim 1, wherein said estimating step is executed to derive an average intensity value from said group of interference light intensity values, obtain adjusted values by subtracting said average intensity value from said intensity values, respectively, and obtain new functions, as the characteristic functions, by substituting said adjusted values into a formula representing amplitude components of a waveform substantially extending through said adjusted values.

4. A surface profile measuring method as defined in claim 2, wherein said estimating step is executed to derive an average intensity value from said group of interference light intensity values, obtain adjusted values by subtracting said average intensity value from said intensity values, respectively, and obtain new functions, as the characteristic functions, by substituting said adjusted values into a formula representing amplitude components of a waveform substantially extending through said adjusted values.

5. A surface profile measuring apparatus for measuring rugged profiles of object surfaces, comprising:
   a white light source for emitting white light to irradiate an object surface and a reference surface;
   varying means for varying a relative distance between said object surface and said reference surface;
   frequency band limiting means for limiting a frequency band of the white light emitted from said white light source to a particular frequency band;
   image pickup means for picking up an image of said object surface along with variations in interference fringes occurring with the variations in the relative distance between said object surface and said reference surface irradiated with the white light;
   sampling means having a function for acquiring intensity values of interference light from a plurality of particular locations on said object surface imaged, said sampling means acquiring interference light intensity values successively from each of said particular locations at sampling intervals corresponding to a bandwidth of said particular frequency band, said intensity values corresponding to variations in the interference fringes occurring with the variations in the relative distance between said object surface and said reference surface caused by said varying means;
   storage means having a function for storing a group of interference light intensity values acquired by said sampling means from each of said particular locations, said storage means storing said group of interference light intensity values acquired at said sampling intervals; and
   computing means having a function for measuring the rugged profile of said object surface by deriving a height in each of said particular locations from said group of interference light intensity values stored in said storage means, said computing means estimating characteristic functions based on amplitude components of a theoretical waveform of intensity value variations derived from said group of interference light intensity values stored in said storage means, and determining the height in each of said particular locations based on a peak position of the characteristic functions estimated.

6. A surface profile measuring apparatus as defined in claim 5, wherein said sampling means is operable with said sampling intervals determined by dividing π by said bandwidth of said particular frequency band.

7. A surface profile measuring apparatus as defined in claim 5, wherein said computing means is operable to derive an average intensity value from said group of interference light intensity values, obtain adjusted values by subtracting said average intensity value from said intensity values, respectively, and obtain new functions, as the characteristic functions, by substituting said adjusted values into a formula representing amplitude components of a waveform substantially extending through said adjusted values.

8. A surface profile measuring apparatus as defined in claim 6, wherein said computing means is operable to derive an average intensity value from said group of interference light intensity values, obtain adjusted values by subtracting said average intensity value from said intensity values, respectively, and obtain new functions, as the characteristic functions, by substituting said adjusted values into a formula representing amplitude components of a waveform substantially extending through said adjusted values.

9. A surface profile measuring apparatus as defined in claim 5, wherein said frequency band limiting means comprises a band-pass filter disposed on an optical path extending from said white light source to said image pickup means for passing only white light in said particular frequency band.

10. A surface profile measuring apparatus as defined in claim 6, wherein said frequency band limiting means comprises a band-pass filter disposed on an optical path extending from said white light source to said image pickup means for passing only white light in said particular frequency band.

11. A surface profile measuring apparatus as defined in claim 7, wherein said frequency band limiting means comprises a band-pass filter disposed on an optical path extending from said white light source to said image pickup means for passing only white light in said particular frequency band.

12. A surface profile measuring apparatus as defined in claim 8, wherein said frequency band limiting means comprises a band-pass filter disposed on an optical path extending from said white light source to said image pickup means for passing only white light in said particular frequency band.

13. A surface profile measuring apparatus as defined in claim 5, wherein said frequency band limiting means comprises an optical system extending from said white light source to said image pickup means for reducing said frequency band of the white light emitted from said white light source to said particular frequency band.

14. A surface profile measuring apparatus as defined in claim 6, wherein said frequency band limiting means comprises an optical system extending from said white light source to said image pickup means for reducing said frequency band of the white light emitted from said white light source to said particular frequency band.

15. A surface profile measuring apparatus as defined in claim 7, wherein said frequency band limiting means comprises an optical system extending from said white light source to said image pickup means for reducing said frequency band of the white light emitted from said white light source to said particular frequency band.

16. A surface profile measuring apparatus as defined in claim 8, wherein said frequency band limiting means comprises an optical system extending from said white light source to said image pickup means for reducing said frequency band of the white light emitted from said white light source to said particular frequency band.

17. A surface profile measuring apparatus as defined in claim 5, wherein said frequency band limiting means comprises frequency sensitivity of said image pickup means for sensing the white light in said particular frequency band.

18. A surface profile measuring apparatus as defined in claim 6, wherein said frequency band limiting means comprises frequency sensitivity of said image pickup means for sensing the white light in said particular frequency band.

19. A surface profile measuring apparatus as defined in claim 7, wherein said frequency band limiting means comprises frequency sensitivity of said image pickup means for sensing the white light in said particular frequency band.

20. A surface profile measuring apparatus as defined in claim 8, wherein said frequency band limiting means comprises frequency sensitivity of said image pickup means for sensing the white light in said particular frequency band.

* * * * *